United States Patent
Lin et al.

(10) Patent No.: US 11,757,816 B1
(45) Date of Patent: Sep. 12, 2023

(54) SYSTEMS AND METHODS FOR DETECTING SCAM EMAILS

(71) Applicant: Trend Micro Incorporated, Tokyo (JP)

(72) Inventors: Tsung-Fu Lin, Taipei (TW); Jyh-Ying Peng, Taipei (TW); Che-Fu Yeh, Taipei (TW); Yen-Shuo Huang, Taipei (TW); Jeng-Yan Shen, Taipei (TW)

(73) Assignee: Trend Micro Incorporated, Tokyo (JP)

( * ) Notice: Subject to any disclaimer, the term of this patent is extended or adjusted under 35 U.S.C. 154(b) by 416 days.

(21) Appl. No.: 16/679,567

(22) Filed: Nov. 11, 2019

(51) Int. Cl.
  *H04L 51/212* (2022.01)
  *G06Q 10/107* (2023.01)
  *H04L 9/40* (2022.01)

(52) U.S. Cl.
  CPC .......... *H04L 51/212* (2022.05); *G06Q 10/107* (2013.01); *H04L 63/08* (2013.01); *H04L 63/12* (2013.01); *H04L 63/1441* (2013.01)

(58) Field of Classification Search
  CPC ........ H04L 51/12; G06Q 10/107; H04L 63/08; H04L 63/12; H04L 63/1441
  See application file for complete search history.

(56) References Cited

U.S. PATENT DOCUMENTS

| | | | | |
|---|---|---|---|---|
| 8,205,258 | B1* | 6/2012 | Chang et al. ........ | G06F 21/566 726/22 |
| 10,453,017 | B1* | 10/2019 | Richards et al. ... | G06Q 10/0635 |
| 2003/0172291 | A1* | 9/2003 | Judge et al. ....... | H04L 63/1441 726/1 |
| 2004/0177110 | A1* | 9/2004 | Rounthwaite et al. . | H04L 51/12 709/202 |
| 2006/0095966 | A1* | 5/2006 | Park ...................... | H04L 51/12 726/22 |
| 2008/0222728 | A1* | 9/2008 | Chavez et al. ......... | G06F 21/56 726/24 |
| 2009/0083852 | A1* | 3/2009 | Kuo et al. ............ | G06F 21/564 726/22 |
| 2012/0254333 | A1* | 10/2012 | Chandramouli et al. . | G06N 5/04 709/206 |
| 2015/0067832 | A1 | 3/2015 | Sastry | |

(Continued)

OTHER PUBLICATIONS

Enhanced Trend Micro Security protects inboxes from scams and phishing attacks, Sep. 11, 2019, 2 sheets, retrieved from the internet: https://www.helpnetsecurity.com/2019/09/11/trend-micro-security/.

List of email scams - Wikipedia, 2 sheets [retrieved on Nov. 7, 2019], retrieved from the internet: https://en.wikipedia.org/wiki/List_of_email_scams.

(Continued)

*Primary Examiner* — Tonia L Dollinger
*Assistant Examiner* — Jonathan A Sparks
(74) *Attorney, Agent, or Firm* — Beyer Law Group LLP

(57) ABSTRACT

A scam detection system includes a user computer that runs a security application and a backend system that runs a scam detector. An email is received at the user computer. The security application extracts and forwards a content of the email, which includes a body of the email, to the backend system. The email body of the email is anonymized by removing personally identifiable information from the email body. A hash of the anonymized email body is generated and compared against hashes of a whitelist and a blacklist. The anonymized email body is classified. A segment of text of the anonymized email body is identified and provided to the user computer when the anonymized email body is classified as scam.

3 Claims, 6 Drawing Sheets

(56) References Cited

U.S. PATENT DOCUMENTS

| | | | |
|---|---|---|---|
| 2015/0256499 A1* | 9/2015 | Kumar et al. .......... | H04L 67/22 |
| | | | 709/206 |
| 2017/0230323 A1 | 8/2017 | Jakobsson | |
| 2018/0240131 A1 | 8/2018 | Denner et al. | |
| 2018/0241647 A1 | 8/2018 | Baracaldo et al. | |
| 2018/0367511 A1 | 12/2018 | Chichibu | |
| 2019/0014064 A1 | 1/2019 | Strauss et al. | |
| 2019/0149575 A1 | 5/2019 | Bahrs et al. | |
| 2020/0314120 A1* | 10/2020 | Dedenok et al. ...... | H04L 51/12 |
| 2021/0021553 A1* | 1/2021 | Benkovich et al. . | G06F 21/6209 |

OTHER PUBLICATIONS

Trend Micro Fraud Buster - Easily avoid online scams and fraud, Jul. 10, 2018, 3 sheets, retrieved from the internet: https://www.trendmicro.com/en_us/forHome/news-center/article/Trend-Micro-Fraud-Buster.html.

Received a Suspicious Message? - Stop wondering if that odd email or chat message came from a scammer and find out for sure, 3 sheets [retreived on Oct. 14, 2019], retrieved from the internet: https://www.trendmicro.com/en_us/forHome/news-center/article/Trend-Micro-Fraud-Buster.html.

\* cited by examiner

400

401  402

I am Mr. James Pavlosky, the Chief Accountant of the Ministry of Roads and Housing headquarters in Accra, Ghana. I am searching for a reliable person, individual and company to assist me archive this goal. I have no reason to doubt your honesty and credibility hence I make this proposal to you.

Please, treat with utmost confidence and excuse me for the embarrassment this letter might cause you as we have not met or known each other before. I have the mandate to solicit for your assistance for a deal I want to execute, my ministry awarded a contract of US$86,700,000.00 Eighty-Six-Million, Seven Hundred Thousand U.S. Dollars) to a Foreign firms to build High Way and the Government Staff Quarters here in Ghana but because of my position, this contract was over invoiced to US$97,200,000 (Ninety Seven Million, Two Hundred and Thousand United States Dollars).

The original contract sum has been paid to the contractors that executed the project, now we are left with the over-invoiced sum of US$10,500,000.00 (Ten Million, Five Hundred Thousand U.S. Dollars).....

FIG. 4

SYSTEMS AND METHODS FOR DETECTING SCAM EMAILS

BACKGROUND OF THE INVENTION

1. Field of the Invention

The present invention relates generally to computer security, and more particularly but not exclusively to combating scam emails.

2. Description of the Background Art

A scam email is an unsolicited electronic mail that perpetrates a fraud. A typical scam email entices a victim to send money or provide confidential information to the scammer by posing as authorized communication from a foreign government official that needs help with collection, promising inheritance, claiming to be from the police, proposing an investment opportunity that gives extremely high yields, etc. Scam emails are designed to look authentic, making scam emails very difficult for most email users to detect.

SUMMARY

In one embodiment, a scam detection system includes a user computer that runs a security application and a backend system that runs a scam detector. An email is received at the user computer. The security application extracts and forwards a content of the email, which includes a body of the email, to the backend system. The email body of the email is anonymized by removing personally identifiable information from the email body. A hash of the anonymized email body is generated and compared against hashes of a whitelist and a blacklist. The anonymized email body is classified. A segment of text of the anonymized email body is identified and provided to the user computer when the anonymized email body is classified as scam.

These and other features of the present invention will be readily apparent to persons of ordinary skill in the art upon reading the entirety of this disclosure, which includes the accompanying drawings and claims.

DESCRIPTION OF THE DRAWINGS

FIG. 4 shows a snippet of an example email body that may be evaluated for scam using the method of FIG. 3.

The use of the same reference label in different drawings indicates the same or like components.

DETAILED DESCRIPTION

In the present disclosure, numerous specific details are provided, such as examples of systems, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
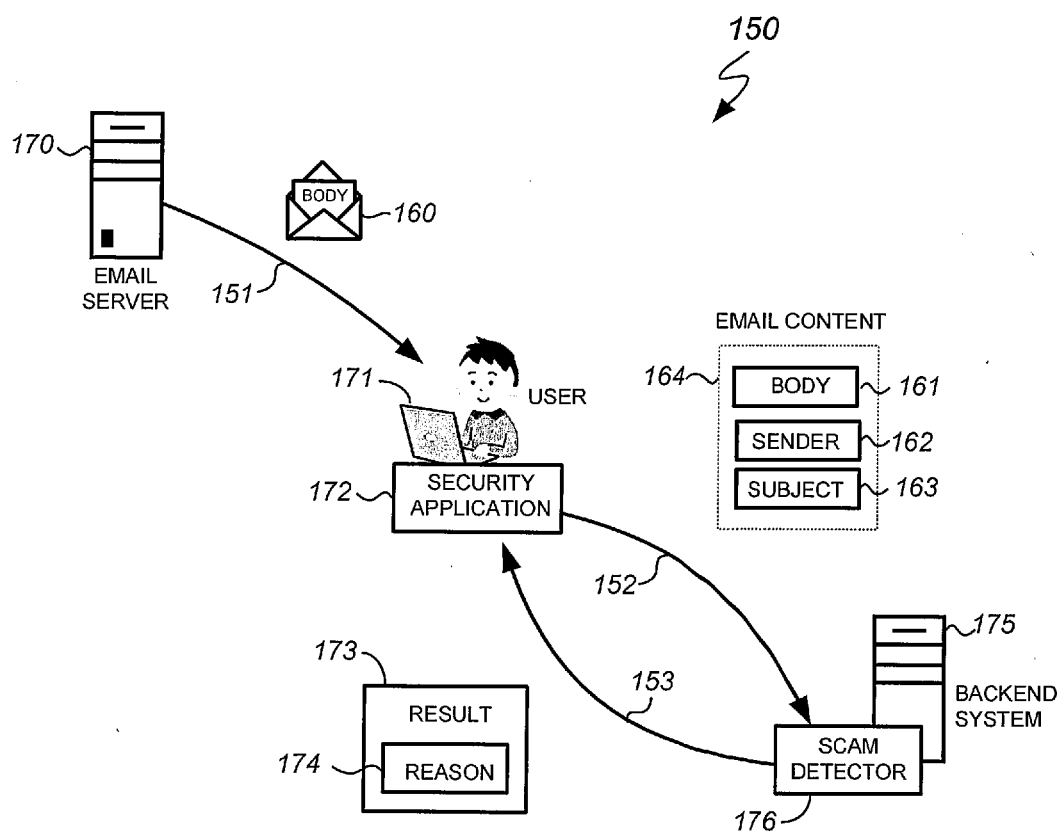
FIG. 1 shows a logical diagram of a system for detecting scam emails in accordance with an embodiment of the prevention.

FIG. 1 shows a logical diagram of a system 150 for detecting scam emails in accordance with an embodiment of the prevention. In the example of FIG. 1, the system 150 includes a security application 172 that is running on a user computer 171 and a scam detector 176 that is running on a backend system 175.

The user computer 171 may be a laptop, desktop, or other computing device employed by a user to send and receive emails. In the example of FIG. 1, the user has an account with an email server 170. The email server 170 may comprise hardware and associated software for providing an email service. In one embodiment, the email server 170 provides a webmail service, which the user accesses over the Internet using the user computer 171 in conjunction with a suitable email client program or a web browser.

The security application 172 may comprise cybersecurity software for protecting the user computer 171 from computer viruses, Trojans, spam emails, and other cyberattacks. The security application 172 may comprise the Trend Micro™ AntiVirus+™, Internet Security™, or Maximum Security™ cybersecurity software, for example. In the example of FIG. 1, the security application 172 has added functionality for detecting scam emails in conjunction with the scam detector 176. The scam email detection functionality of the security application 172 may be generally adapted to suitable cybersecurity software without detracting from the merits of the present invention.

In the example of FIG. 1, the scam detector 176 is running on the backend system 175. The backend system 175 may comprise one or more computers and associated software of a cloud computing infrastructure, a dedicated server computer, or other computing device. The security application 172 and the scam detector 176 may communicate over the Internet or other computer network.

Generally speaking, an email includes a header and a body. The email header includes a subject line, sender information, date and time information, reply-to information, and recipient information. The sender information includes the email address of the sender, which includes a local part and a domain name. The email body comprises the text of the message.

In one embodiment, the scam detector 176 comprises software that is configured to detect scam emails. The scam detector 176 may work in conjunction with the security application 172 to receive a content of an email that has been received at the user computer 171. The email content may include the body, sender information, and subject line of the email. The scam detector 176 is configured to anonymize the email body by removing personally identifiable information from the email body, and to generate a hash of the anonymized email body. The scam detector 176 is configured to consult a reputation database to get the reputation of the sender domain name (i.e., domain name of the sender email address) and objects (e.g., Uniform Resource Locator (URL), phone number) in the email body that can carry a reputation. The scam detector 176 is configured to check the hash of the anonymized email body against hashes stored in a whitelist and a blacklist to determine if the email body is from a known normal email or a known scam email, respectively. The scam detector 176 is configured to classify the anonymized email body using a machine learning module and to extract one or more segments of scam text (i.e., text that is indicative of scam) from the anonymized email body. The scam detector 176 may be configured to provide a result of its evaluation to the security application 172, and include corresponding scam text in the result when the anonymized email body has been classified as scam.

In an example operation, the user employs the user computer 171 to receive an email 160 from the email server 170 (see arrow 151). In the user computer 171, the security application 172 (e.g., using an associated plugin or other module) detects reception of the email 160 and extracts a content 164 of the email 160. In one embodiment, the content 164 includes an email body 161, sender information 162, and subject line 163 of the email 160. The security application 172 forwards the content 164 of the email 160 to the scam detector 176 (see arrow 152), e.g., using an application programming interface of the scam detector 176. The scam detector 176 evaluates the email content 164 to determine if the email 160 is a scam email. The scam detector 176 returns a result 173 that indicates whether or not the email 160 is a scam email (see arrow 153). In the case where the scam detector 176 detects, based on evaluation of the email content 164, that the email 160 is a scam email, the result 173 may include a reason 174 that explains why the email 160 has been detected as scam email. The reason 174 may include one or more scam text extracted from an anonymized email body of the email 160. The result 173 may be displayed on a display screen of the user computer 171 for viewing by the user.

Figure 2:
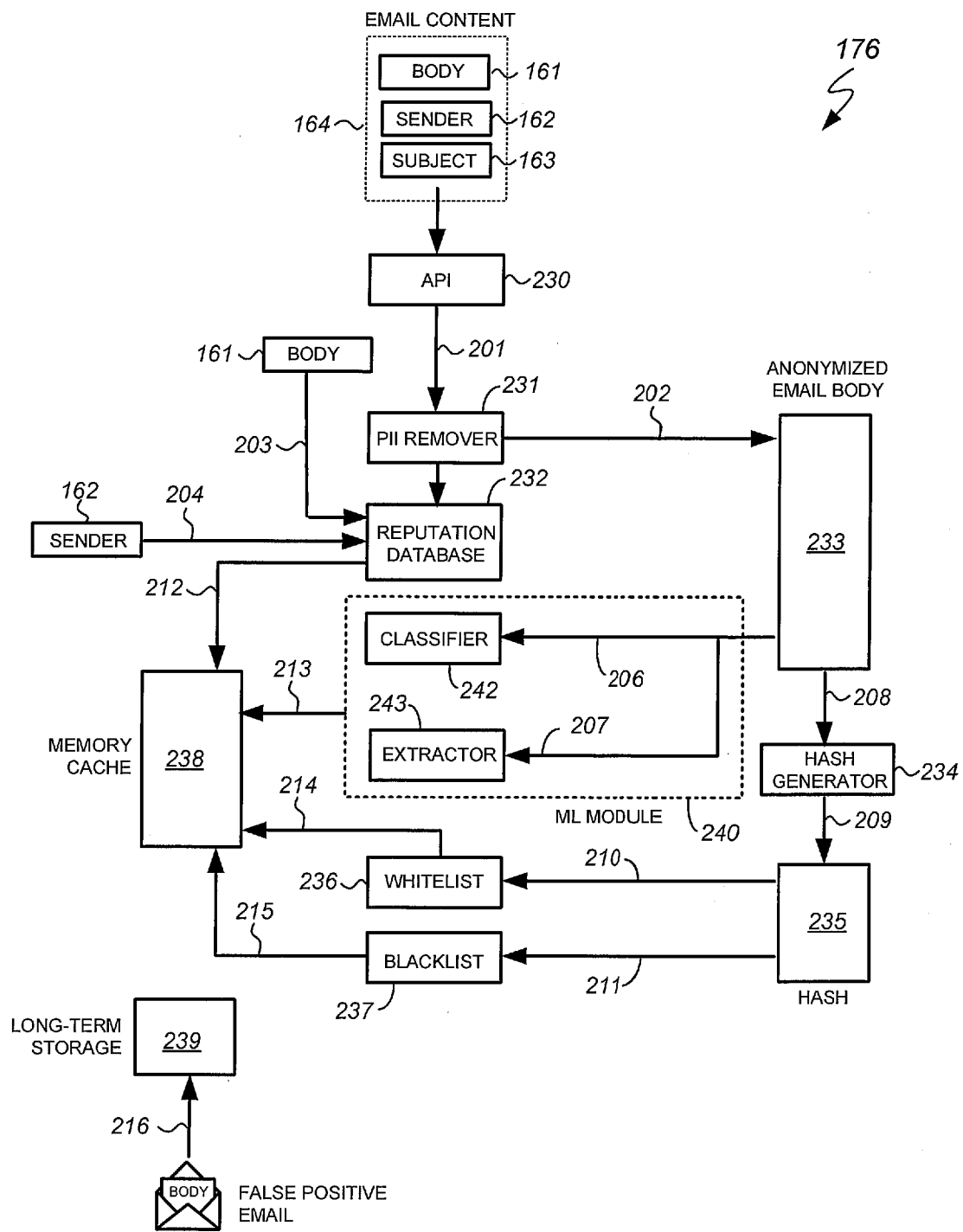
FIG. 2 shows a logical diagram of a scam detector in accordance with an embodiment of the present invention.

FIG. 2 shows a logical diagram of the scam detector 176 in accordance with an embodiment of the present invention. The scam detector 176 may be deployed in the cloud, i.e., accessible over the Internet, to provide scam email detection service to a plurality of security applications 172. In the example of FIG. 2, the scam detector 176 includes an application programming interface (API) 230 that is configured to authenticate and communicate with a subscribing security application 172 that is running on a user computer 171. The API 230 receives, from the security application 172, a content 164 of an email 160 that has been received at the user computer 171. The content 164 includes an email body 161, sender information 162, and a subject line 163 that are extracted from the email 160 at the user computer 171.

A personally identifiable information (PII) remover 231 receives the email body 161 from the API 230 (see arrow 201). To address privacy concerns, the PII remover 231 generates an anonymized email body 233 (see arrow 202) by removing personally identifiable information from the email body 161. Generally speaking, personally identifiable information is data that may be used to identify a specific individual. Personally identifiable information may be identified and removed from the email body 161 using regular expressions or suitable natural language processing (NLP) technique without detracting from the merits of the present invention.

In one embodiment, personally identifiable information removed by the PII remover 231 from the email body 161 to generate the anonymized email body 233 includes credit card number, name, email address, Internet Protocol (IP) address, Uniform Resource Locator (URL), street address, phone number, social security number, passport number, driver's license number, username, password, and credential.

In the example of FIG. 2, the email body 161 is parsed for URLs, telephone numbers, and other objects that can be assigned a reputation. An object may be assigned a bad (i.e., malicious), good, or unknown reputation by cybersecurity experts. A reputation database 232 comprises a data store of objects and their corresponding reputations. The reputation database 232 may comprise one or more reputation databases that indicate the reputations of domain names, URLs, phone numbers, etc. The reputation database 232 may be locally or remotely accessed by the scam detector 176. Generally speaking, the scam detector 176 may detect the target email 160 as a scam email when an object in the sender information 162 (e.g., domain name) or in the email body 161 (e.g., URL) has a bad reputation.

In the example of FIG. 2, the reputation database 232 includes a web reputation database that may be consulted to determine the reputation of the domain name of the sender (see arrow 204) and/or a URL found in the email body 161 (see arrow 203). The scam detector 176 may detect the target email 160 as a scam email when the domain name or the URL has a bad reputation. Similarly, the reputation database 232 may store reputations of telephone numbers. The scam detector 176 may detect the target email 160 as a scam email when a telephone number found in the email body 161 (see arrow 203) has a bad reputation.

In the example of FIG. 2, a machine learning module 240 includes a classifier 242 and a segment extractor 243. The classifier 242 may comprise a machine learning model that has been trained to classify an anonymized email body. The classifier 242 may be trained using training data comprising samples of anonymized email bodies that are known to be scam, i.e., from scam emails. In one embodiment, the classifier 242 comprises a binary classifier. More particularly, the classifier 242 classifies the anonymized email body 233 as scam or not scam. Word embedding, e.g., using Word2Vec models, may be applied on the anonymized email body 233 for input to the classifier 242. In one embodiment, the classifier 242 is trained using the Attention Bidirectional Long Short-Term Memory algorithm. The scam detector 176 detects the target email 160 as a scam email when the classifier 242 classifies the anonymized email body 233 as scam.

The segment extractor 243 may comprise a machine learning model that has been trained to identify, from an anonymized email body, text segments that are indicative of scam. The segment extractor 243 may be trained using training data comprising samples of text that have been found in anonymized email bodies of scam emails. In one embodiment, the segment extractor 242 is trained using the Attention Bidirectional Long Short-Term Memory algorithm. The segment extractor 243 may also be implemented by 1D Convolutional Neural Network or by natural language processing.

In the example of FIG. 2, the segment extractor 243 extracts one or more segments of scam text from the anonymized email body 233 (see arrow 207) when the classifier 242 classifies the anonymized email body 233 as scam. The scam detector 176 may include and highlight identified segments of scam text (see FIG. 1, 174) in the result 173 provided to the user computer 171. The result 173 may include the subject line 163 of the target email 160 for reference or grouping purposes.

In the example of FIG. 2, a hash generator 234 is configured to calculate (e.g., using the minhash algorithm) a hash 235 of the anonymized email body 233. More particularly, the hash generator 234 receives the anonymized email body 233 (see arrow 208), and generates the hash 235 (see arrow 209) by applying a hash function on the anonymized email body 233. A whitelist 236 may comprise a listing of hashes of normal anonymized email bodies, whereas a blacklist 237 may comprise a listing of hashes of malicious anonymized email bodies. The whitelist 236 and the blacklist 237 may be locally or remotely accessed by the scam detector 176. The scam detector 176 may consult the whitelist 236 (see arrow 210) and detect the target email 160 as a normal email when the hash 235 matches (e.g., within a predetermined mathematical distance of) a hash in the whitelist 236. The scam detector 176 may consult the blacklist 237 (see arrow 211) and detect the target email 160 as a scam email when the hash 235 matches a hash in the blacklist 237.

In the example of FIG. 2, the scam detector 176 may store data in a memory cache 238 and a long-term storage 239. The memory cache 238 may be locally accessed by the scam detector 176. For example, the memory cache 238 may be in a memory device (e.g., random access memory (RAM), non-volatile RAM) of the backend system 175. The long-term storage 239 may comprise a locally or remotely accessible data storage device, such as a local hard disk drive or remote cloud storage. As their names indicate, the memory cache 238 has faster access times relative to the long-term storage 239. In one embodiment, the memory cache 238 stores data up to a maximum of 72 hours, whereas data may be stored indefinitely in the long-term storage 239.

The scam detector 176 may be configured to store in the memory cache 238 an anonymized email body of a target email that has been detected to be a scam email. In the example of FIG. 2, the scam detector 176 is configured to store in the memory cache 238 the anonymized email body 233 of the target email 160 that has been detected to be a scam email after consulting the reputation database 232 (see arrow 212), after classification by the classifier 242 (see arrow 213), or after consulting the blacklist 237 (see arrow 215).

The scam detector 176 may be configured to store in the memory cache 238 the hash of an anonymized email body of a target email that has not been detected to be a scam email. In the example of FIG. 2, the scam detector 176 is configured to store in the memory cache 238 the hash 235 of the anonymized email body 233 of the target email 160 that has been deemed to be a normal email after the domain name of the sender of the target email 160 has been found to have a good reputation (see arrow 212), after the classifier 242 has not classified the anonymized email body 233 as scam (see arrow 213), or after consulting the whitelist 236 (see arrow 214).

The scam detector 176 may be configured to store in the long-term storage 239 target emails that have been reported as false positives. More particularly, when a target email that has been detected by the scam detector 176 as a scam email turns out to be actually a normal email (e.g., as reported by a user), the scam detector 176 may receive the target email, encrypt the target email, and store the encrypted target email in the long-term storage 239 (see arrow 216). The scam detector 176 may receive false positive emails by way of the security application 172 or other sources.

Figure 3:
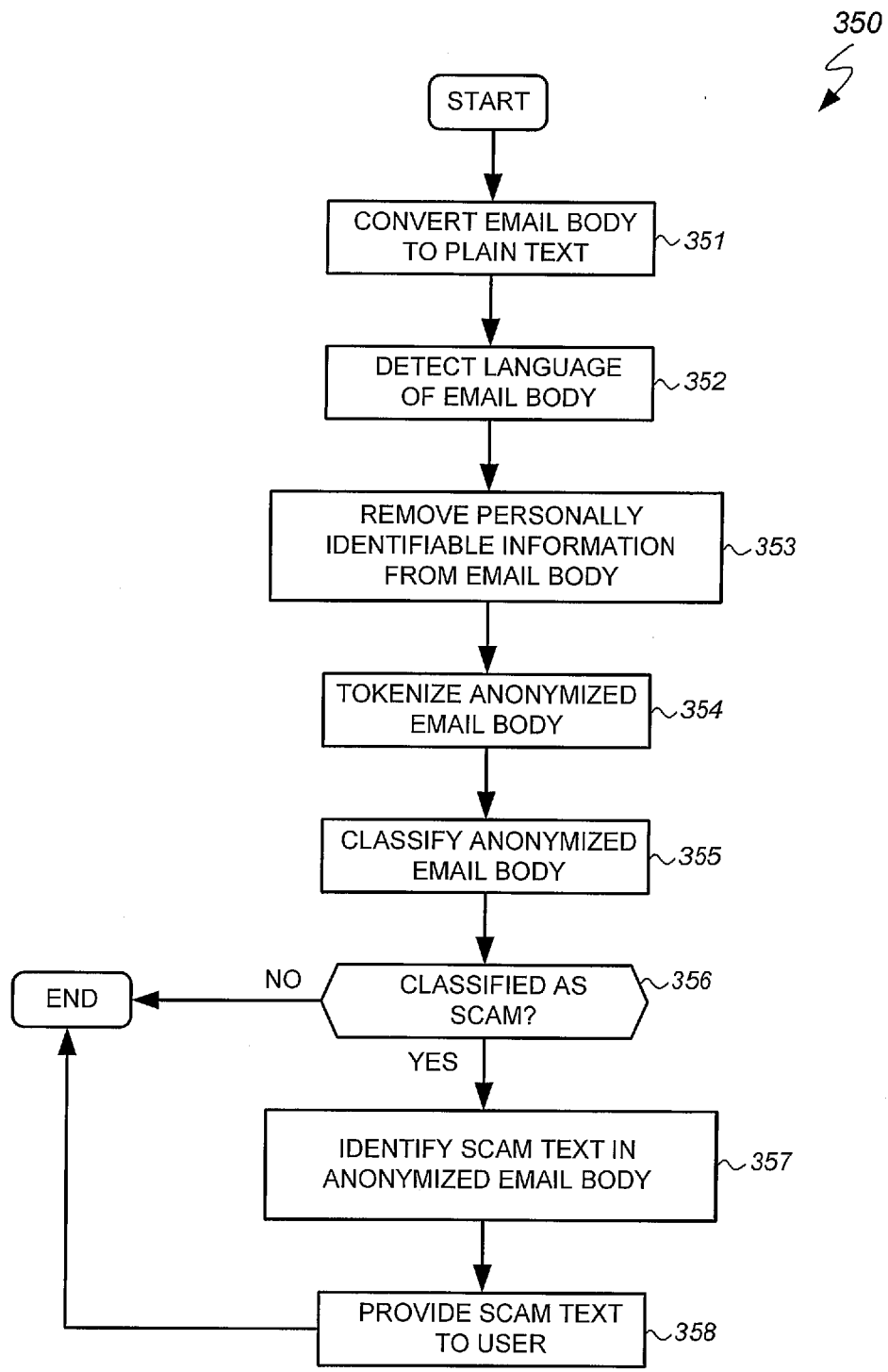
FIG. 3 shows a flow diagram of a method of detecting scam emails in accordance with an embodiment of the present invention.

FIG. 3 shows a flow diagram of a method 350 of detecting scam emails in accordance with an embodiment of the present invention. The method 350 provides an example of evaluating a target email for scam using the machine learning module 240 of the scam detector 176. FIG. 4 shows, for illustration purposes, a snippet of an example email body 400 that may be evaluated for scam.

The method 350 receives an email body of a target email to be evaluated for scam, and converts the email body to plain text (FIG. 3, step 351). The conversion to plain text may or may not be necessary depending on the format of the target email. For example, an email body in hypertext markup language (HTML) format, such as the case with webmails, may be converted from HTML to plain text before further processing. The language of the email body may be detected (FIG. 3, step 352), e.g., based on the content of the email body. Different scam detectors may be employed for different languages, and detecting the language of the email body allows for selection of the suitable scam detector. In the example of FIG. 3, the scam detector 176 detects scam emails that are in the English language.

Personally identifiable information is removed from the email body to generate an anonymized email body of the target email (FIG. 3, step 353). In the example email body 400 of FIG. 4, "Mr. James Pavlosky" (FIG. 4, 401) have been identified as a personally identifiable information, e.g., using regular expressions and/or natural language processing. Personally identifiable information may be removed from the email body by replacing the personally identifiable information with a predetermined mask, such as "MASK_NAME". More particularly, the text segment, "I am Mr. James Pavlosky, the Chief Accountant of the Ministry...", may be replaced with:

"I am MASK_NAME, the Chief Accountant of the Ministry...", in the anonymized email body. The predetermined mask indicates a location where a personally identifiable information has been removed.

The anonymized email body is tokenized to separate the words of the anonymized email body (FIG. 3, step 354). In the example email body 400 of FIG. 4, the anonymized email body may be tokenized to extract the following tokens:

"I", "am", "Mr.", "James", "Pavlosky", ",", "the", "Chief", "Accountant",....etc. Tokenizing the anonymized email body facilitates processing of the contents of the email body.

The anonymized email body may be classified by the classifier 242 of the machine learning module 240 (FIG. 3, step 355). The tokens of the anonymized email body may be word embedded to generate vectors that are input to the classifier 242 for classification. When the anonymized email body is classified as scam, the segment extractor 243 of the machine learning module 242 identifies one or more segments of scam text in the anonymized email body (FIG. 3, step 357). Identified scam text may be included in the result that is provided to the user (FIG. 3, step 358). In the example of FIG. 4, example scam texts that may be identified include:

"I am Mr. James Pavlovsky, the Chief Accountant of the Ministry of Roads and Housing" (presence of a name and authority is indicative of impersonation);

"treat with utmost confidence" (presence of confidentiality is indicative of scammer's attempt to prevent potential victim from investigating);

"over-invoiced sum of US$10,500,000.00.00 (Ten Million, Five Hundred Thousand U.S. Dollars)" (presence of reward is indicative of scammer's attempt to entice the potential victim); and "I am searching for a reliable person, individual and company to assist me...", (FIG. 4, 402) due to the presence and location of the tokens "searching", "reliable", "person" in the anonymized email body relative to other tokens (e.g., "Ministry", "Dollars", "over-invoiced") that are indicative of scam.

Figure 5:
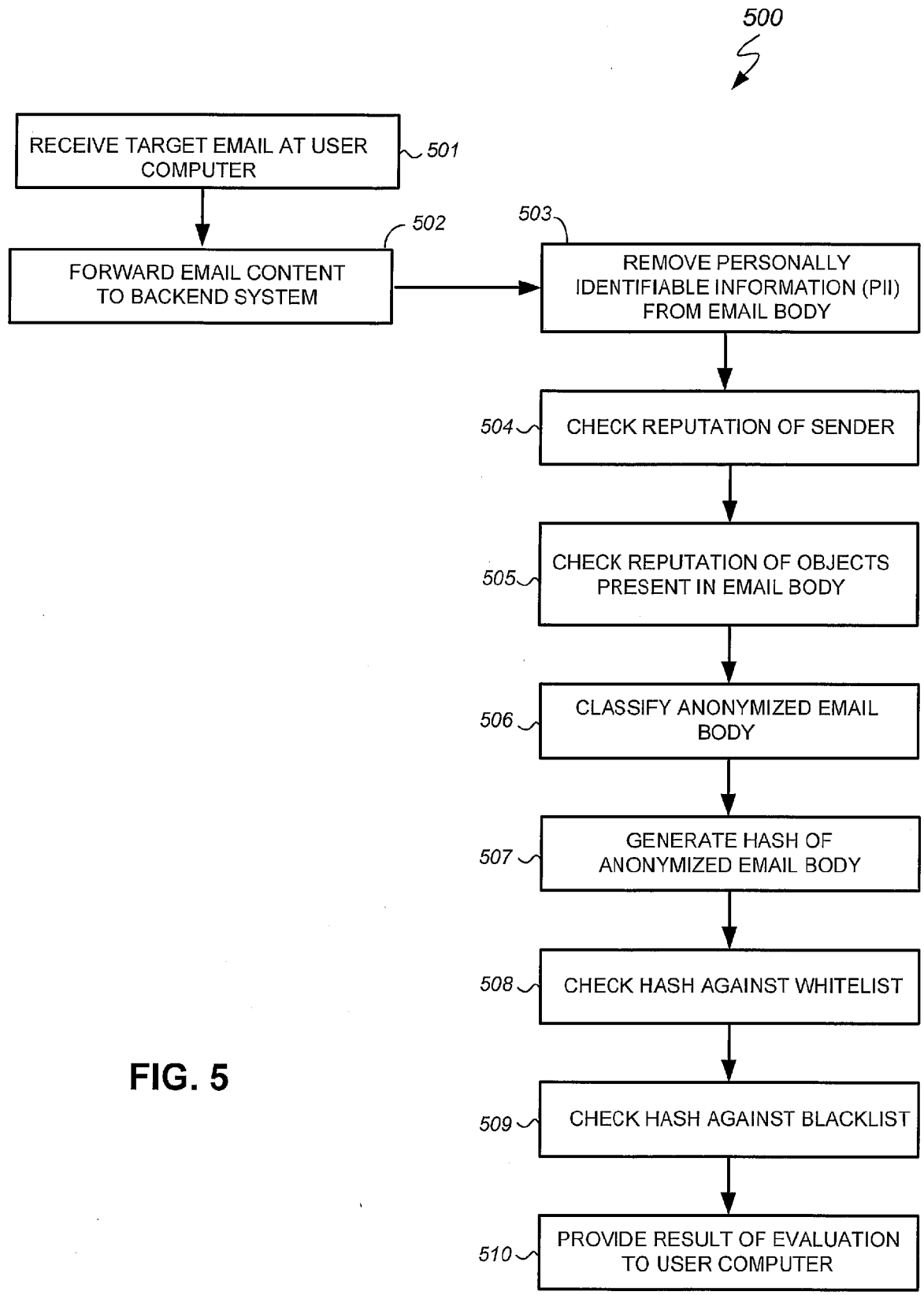
FIG. 5 shows a flow diagram of a method of detecting scam emails in accordance with an embodiment of the present invention.

FIG. 5 shows a flow diagram of a method 500 of detecting scam emails in accordance with an embodiment of the present invention. Steps 501 and 502 may be performed by the user computer 171 as programmed with the security application 172 (see FIG. 1) and steps 503-510 may be performed by the backend system 175 as programmed with the scam detector 176. As can be appreciated, the method 500 may also be performed by other components without detracting from the merits of the present invention.

In the example of FIG. 5, a target email is received at a user computer that runs a security application (FIG. 5, step 501). The security application, in response to detecting reception of the target email at the user computer, extracts a content of the target email and provides the extracted content of the target email to a backend system that runs a scam detector (FIG. 5, step 502). The extracted content may include the sender email address, email body, and subject line of the target email.

At the backend system, personally identifiable information is removed from the email body of the target email to generate an anonymized email body (FIG. 5, 503). The reputation of the domain name of the sender email address of the target email (FIG. 5, step 504) and the reputation of objects present in the email body are checked against reputation databases (FIG. 5, step 505). The anonymized email body is classified using a machine learning model (FIG. 5, step 506). A hash of the anonymized email body is generated (FIG. 5, step 507) and compared against hashes of a whitelist (FIG. 5, step 508) and a blacklist (FIG. 5, step 509). The result of the evaluation of the content of the target email is provided to the user computer for viewing by the user (FIG. 5, step 510). One or more corrective actions may be performed when the target email, based on evaluation of its content, is detected as a scam email. For example, the target email may be quarantined, blocked, deleted, etc. at the user computer or other computers.

Figure 6:
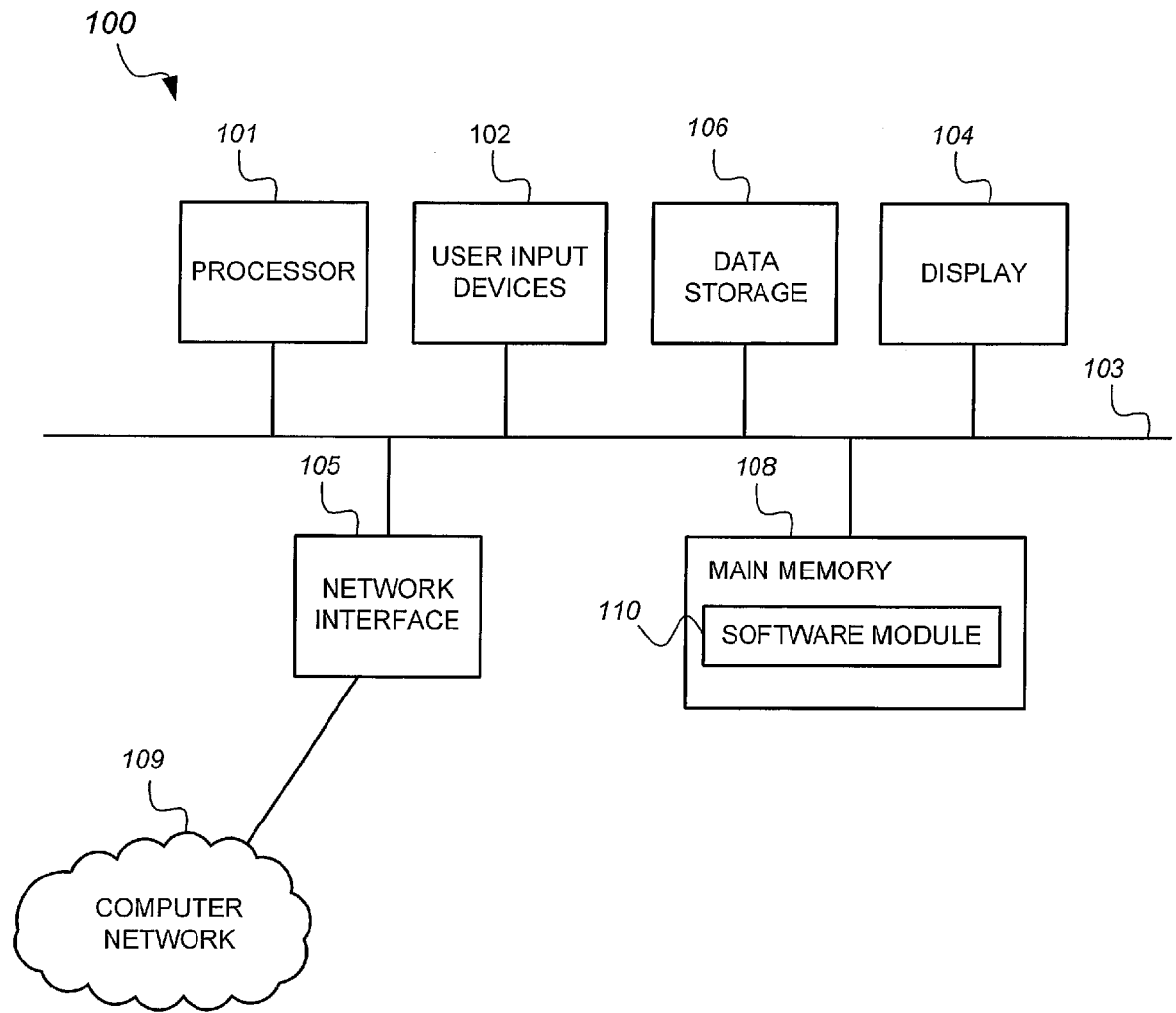
FIG. 6 shows a logical diagram of a computer system that may be employed with embodiments of the present invention.

Referring now to FIG. 6, there is shown a logical diagram of a computer system 100 that may be employed with embodiments of the present invention. The computer system 100 may be employed as a backend system, user computer, or other computer described herein. The computer system 100 may have fewer or more components to meet the needs of a particular application. The computer system 100 may include one or more processors 101. The computer system 100 may have one or more buses 103 coupling its various components. The computer system 100 may include one or more user input devices 102 (e.g., keyboard, mouse), one or more data storage devices 106 (e.g., hard drive, optical disk, solid state drive), a display screen 104 (e.g., liquid crystal display, flat panel monitor), a computer network interface 105 (e.g., network adapter, modem), and a main memory 108 (e.g., random access memory). The computer network interface 105 may be coupled to a computer network 109, which in this example includes the Internet.

The computer system 100 is a particular machine as programmed with one or more software modules 110, comprising instructions stored non-transitory in the main memory 108 for execution by the processor 101 to cause the computer system 100 to perform corresponding programmed steps. An article of manufacture may be embodied as computer-readable storage medium including instructions that when executed by the processor 101 cause the computer system 100 to be operable to perform the functions of the one or more software modules 110.

The software modules 110 may comprise a scam detector when the computer system 100 is configured as a backend system and may comprise a security application when the computer system 100 is configured as a user computer.

Systems and methods for detecting scam emails have been disclosed. While specific embodiments of the present invention have been provided, it is to be understood that these embodiments are for illustration purposes and not limiting. Many additional embodiments will be apparent to persons of ordinary skill in the art reading this disclosure.

What is claimed is:

1. A method of detecting scam emails, the method comprising:
   at a user computer:
      receiving an email; and
      forwarding, by a security application running at the user computer, at least an email body of the email from the user computer to a backend system for evaluation; and
   at the backend system:
      removing personally identifiable information from the email body to generate an anonymized email body;
      classifying the anonymized email body to determine whether or not the email is a scam email;
      classifying the anonymized email body as a scam;
      identifying a segment of text that is indicative of scam emails in the anonymized email body; and
      providing a result to the user computer, wherein the result includes the segment of text.

2. A system for detecting scam emails, the system comprising:
   a user computer comprising at least one processor and a memory that stores instructions of a security application, the instructions of the security application when executed by the at least one processor of the user computer cause the user computer to extract a content of an email that has been received at the user computer and forward the extracted content of the email; and
   a backend system comprising at least one processor and a memory that stores instructions of a scam detector, the instructions of the scam detector when executed by the at least one processor of the backend system cause the backend system to:
      receive the extracted content that has been forwarded from the user computer, remove personally identifiable information from an email body that is included in the extracted content to generate an anonymized email body,
      check a reputation of an object that is included in the email body,
      classify the anonymized email body to determine whether or not the anonymized email body is a scam,
      generate a hash of the anonymized email body,
      compare the hash to a whitelist,
      compare the hash to a blacklist, and
      provide a result of evaluation of the extracted content to the user computer,
   wherein the instructions of the scam detector when executed by the at least one processor of the backend system further cause the backend system to identify, from the anonymized email body, a segment of text that is indicative of scam and to provide the segment of text to the user computer.

3. A method of detecting scam emails, the method comprising:
   removing personally identifiable information from an email body of an email to generate an anonymized email body;
   generating a hash of the anonymized email body;
   classifying the anonymized email body to determine whether or not the anonymized email body is a scam; and
   checking the hash against a listing of hashes,
   wherein the anonymized email body is classified as a scam and the method further comprises:
      identifying, in the anonymized email body, a segment of text that is indicative of scam; and
      providing the segment of text to a user computer.

* * * * *